United States Patent Office 3,006,971
Patented Oct. 31, 1961

3,006,971
PREPARATION OF BICYCLIC NITRO COMPOUNDS
Henry Feuer and Robert Miller, West Lafayette, Ind., assignors to Purdue Research Foundation, Lafayette, Ind., a corporation of Indiana
No Drawing. Filed June 19, 1958, Ser. No. 744,630
10 Claims. (Cl. 260—644)

Our invention relates to a method of producing bicyclic nitro compounds and to new bis-bicyclic nitro compounds produced thereby. More specifically, it relates to the produtcion of bicyclic nitro compounds by the reaction of nitroesters with a diene in the presence of a weak base.

Our new bicyclic nitro compounds are useful as solvents and as plasticizers for silicone oil, silicone grease, polyvinyl alcohol, methyl methacrylate, polystyrene, and the like. They exhibit camphoraceous odor and are usable as camphor substitutes. They are important intermediates in the preparation of diamines, nitroglycols, amino glycols, nitro acids and amino acids which constitue monomers for the preparation of important polymers.

In the past, the preparation of bicyclic nitro compounds and in particular the new bicyclic nitro compounds of our invention has been regarded as exceedingly difficult and generally, impractical. Previously, bicyclic nitro compounds have been produced by the addition of nitro olefins to certain dienes at elevated pressures in low boiling solvents or in a few isolated cases, at atmospheric pressure in high boiling solvents. This prior method has been impractical for the reason that the nitro olefins used must first be prepared, usually from the corresponding alcohols by dehydration or from the corresponding esters such as the acetates, by elimination of acetic acid. Both methods require elevated temperatures. The nitro olefins formed by these methods must then usually be distilled and purified by rectification. Even with low molecular weight olefins, there is a tendency for either decomposition or polymerization to take place during this purification. With the higher molecular weight nitro olefins, the tendency for decomposition is much greater. Many nitro olefins cannot be stored, especially at room temperature, without polymerization occurring. Our new process avoids all of these difficulties by starting with nitroesters instead of the corresponding nitro olefins. Our new process is convenient, economical and results in good yields of the desired bicyclic nitro compounds and permits the production of new and different bicyclic nitro compounds of broad scope and wide utility.

Our new process involves the produtcion of bicyclic nitro compounds by reacting a nitroester with a diene, preferably in a suitable solvent, at temperatures slightly above room temperature in the presence of a weak base. Our new process employs starting materials, namely nitroesters, which are quite stable at room temperature in place of the highly unstable nitro olefins previously used in producing bicyclic nitro compounds. Our process has the added advantage of permitting the ready production of desired bicyclic nitro compounds using nitroesters of any size molecule, thus avoiding the tedious and difficult production, storage and usage of high molecular weight nitro olefins.

The bicyclic nitro compounds produced in accordance with our invention have the following structural formula:

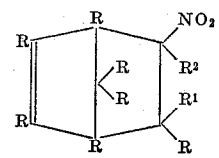

where R is selected from the group consisting of hydrogen, alkyl containing 1 to 10 carbon atoms and aryl; $R^1$ is selected from the group consisting of hydrogen, alkyl containing from 1 to 10 carbon atoms, aryl, perhalo alkyl, $CH_2OR$, $-CH(OR^3)_2$

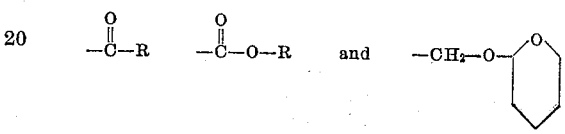

$R^2$ is selected from the group consisting of hydrogen, alkyl, aryl, halo, perhalo alkyl, $-NO_2$, nitro alkyl, $-CH_2OX$, $-CH(OR^3)_2$, $$-CN \quad -\overset{O}{\underset{\|}{C}}-R \quad -\overset{O}{\underset{\|}{C}}-NH_2 \quad -\overset{O}{\underset{\|}{C}}-OR$$

and the radical:

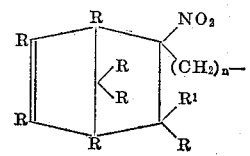

where $n$ is an integer having a value ranging from 1 to 10, where X is selected from the group consisting of alkyl having from 1 to 10 carbon atoms and a tetrahydropyranyl and $R^3$ is alkyl having from 1 to 10 carbon atoms. Typical bicyclo nitro compounds which we can obtain according to our new process include: bicyclo[2.2.1]-2-nitro-2,3-dimethyl-5-heptene, bicyclo[2.2.1]-2-nitro-3-perfluoropropyl-5,6-dimethyl-5-heptene, bicyclo[2.2.1]-1,4,5,6,7,7-hexaphenyl-2-nitro-2-(3,3-nitrobutyl)-5-heptene, bicyclo[2.2.1]-2-chloro-2-nitro-5,6-diphenyl-7,7-dimethyl-5-heptene, 1,3-bis-(bicyclo[2.2.1]-2-nitro-3-phenyl-5-heptene)-propane, bicyclo[2.2.1]-2-nitro-2-cyano-3,3-dimethyl-5-heptene, bicyclo[2.2.1]-2-nitro-2-carbamyl-3,3-dimethyl-5-heptene, bicyclo[2.2.1]-2-nitro-3-(2-tetrahydropyranoxmethyl)-5-heptene, bicyclo[2.2.1]-2-nitro-2-acetyl-5-heptene, bicyclo[2.2.1]-1,5,6-triethyl-2-nitro-2-methyl-5-heptene-3-al, diethyl acetal of bicyclo[2.2.1]-2-nitro-2-butyl-6-pentyl-5-heptene-3-al, bicyclo[2.2.1]-2-nitro-2-ethyl-3-p-tolyl-5-heptene, bicyclo[2.2.1]-2,2-dinitro-3-methyl-5-heptene, bicycle[2.2.1]-2-nitro-2-carbethoxy-3-butyl-5-heptene, bicyclo[2.2.1]-2-nitro-2-acetyl-3-propyl-5-heptene, dioctyl acetal of bicyclo[2.2.1]-1,4-diethyl-3,6-dimethyl-2-nitro-5-heptene-2-al, bicyclo[2.2.1]-2-nitro-2-p-tolyl-3-methyl-4,6-diphenyl-5-heptene, methyl ether of bicyclo[2.2.1]-2-nitro-2- methylol-5-heptene and bis-bicyclonitro compounds represented by the structural formula:

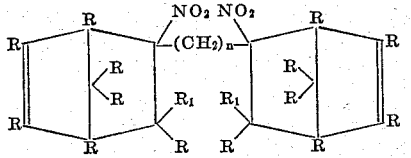

the various radicals having the same values previously set forth. Examples of such compounds include: 1,5-(bis-bicyclo[2.2.1]-2-nitro-3-phenyl-3-methyl-5-heptene)-pentane, 1,8-(bis-bicyclo[2.2.1]-2-nitro-3-perfluoropropyl-5-heptene)-octane, 1,7-(bis-bicyclo[2.2.1]-2-nitro-3-acetyl-5-heptene)-heptane, 1,3-(bis-bicyclo[2.2.1]-2-nitro-3-(2-tetrahydropyranoxymethyl)-5-heptene)-propane and 1,2-(bis-bicyclo[2.2.1]-2-nitro-3-methoxy-5-heptene)-ethane.

The nitroesters which we employ in our process have the following structural formula:

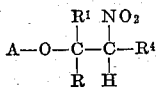

where $R^4$ is selected from the group consisting of hydrogen, alkyl, aryl, halo, perhalo alkyl, nitro, nitro alkyl, —COOX, —CH$_2$—O—X, —CH(OR$^3$)$_2$, —CN,

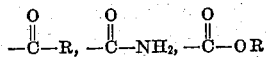

and the following radical:

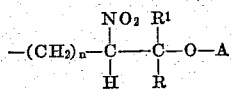

where A is selected from the group consisting of

—SO$_2$R, —SO$_3$H, —NO$_2$, —PO$_3$H$_2$ and other phosphoric acid radicals. Examples of 2-nitroesters which we can employ include 2-nitrobutyl acetate, 2-nitrobutyl formate, 2-nitrobutyl phosphate, 2-nitrobutyl nitrate, 2-nitrobutyl sulfonate, 3,3,4,4,5,5,5-heptafluoro-2-nitro-1-pentyl acetate, 2,5-dinitrohexyl acetate, 2,2-dinitroethyl acetate, 2,4,4-trinitro-3,3-dimethylbutyl acetate, 2-nitro-2-phenylethyl acetate, 2-nitro-1-phenylbutyl acetate, 1,6-diacetoxy-2,5-dinitrohexane, 3,3,4,4,5,5,5-heptafluoro-1-nitro-2-pentyl phosphate, 2-chloro-2-nitroethyl acetate, 2-carbethoxy-2-nitroethyl acetate, 2-acetoxy-3-nitrobutane, 1,7-diacetoxy-1,7-diphenyl-2,6-dinitroheptane, 3-acetoxy-3-methyl-2-nitrobutane nitrile, 3-acetoxy-3-methyl-2-nitrobutanamide, 2-(2-acetoxy-3-nitropropoxy)tetrahydropyran, diethyl acetal of 3-acetoxy-4-nitro-2-pentanone.

In preparing our bicyclic nitro compounds, we react the 2-nitroester with cyclopentadienes of the following general formula:

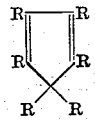

The weak bases which can be used in carrying out our process for the production of bicyclic nitro compounds include carbonates, bicarbonates, sulfites, phosphates, borates, and hydrides; such as, for example, sodium acetate, sodium hydroxide, other similar alkali metal and alkaline earth metal hydroxides, alkali metal lower alkyl esters, and the like.

Our reaction for the production of bicyclic nitro compounds from nitroesters and dienes is preferably effected in the presence of a solvent inert to the reactants and resulting bicyclic nitro compounds, as, for example, ethanol, t-butanol or benzene. The reaction can, however, be carried out without the use of a solvent medium.

The reaction can be carried out at temperatures ranging from 25 to 100° C. A reaction temperature of 40-55° C., at atmospheric pressure for approximately 18-25 hours is, however, usually sufficient when carrying out the reaction in a hydroxylic solvent, such as ethanol or t-butanol. In non-hydroxylic solvents, such as benzene, somewhat higher temperatures (40-80° C.) are preferred for optimum results.

The following examples are offered to illustrate our new invention, but we do not intend to be limited to the specific materials, proportions, or procedures set forth therein. Rather, we intend to include within the scope of our invention all equivalents obvious to those skilled in the arts.

*Example I*

In a 300 ml. 3-necked flask equipped with a stirrer, condenser, and a thermometer were placed 15.05 g. (0.05 mole) of 2-perfluoropropyl-2-acetoxy-1-nitroethane, 4.95 g. (0.075 mole) of cyclopentadiene, 4.10 g. (0.05 mole) of anhydrous sodium acetate and 140 ml. of absolute ethanol. The temperature was then raised to 48–50° C. and maintained at this point for 18 hours. The ethanol was then stripped off in vacuo and 20 ml. of ether was added to the residual material. After approximately 15 minutes, the material was filtered through a sintered glass funnel. The ether was removed in vacuo and the residual oil was distilled. There was no forerun, and 12.1 g. of bicyclo-[2.2.1]-2-nitro-3-perfluoropropyl-5-heptene (79% yield) was collected; B.P. 70–71° C. at 3 mm.; $n_D^{22}$ 1.4012.

*Analysis.*—Calculated for $C_{10}$, $H_8$, $F_7$, $NO_2$: C, 39.08; H, 2.61; N, 4.56. Found: C, 38.96; H, 2.61; N, 4.69.

*Example II*

To a 3-necked flask equipped with a stirrer, condenser and a thermometer, containing 2.46 g. (0.03 mole) of anhydrous sodium acetate, 2.5 (0.038 mole) of cyclopentadiene and 50 ml. of 95% ethanol was added at 34° C., 4.38 g. (0.15 mole) of 1,6-diacetoxy-2,5-dinitrohexane, over a 5 hour period. After the addition was complete, the temperature of the reaction mixture was raised to 40–41° C. and maintained at this point for 17 additional hours time. The reaction mixture was then stripped of alcohol in vacuo and the residue was transferred to a separatory funnel with the aid of a small amount of water and ether. The aqueous portion was extracted with a small portion of ether until the ether layer was clear. The extracts were combined, and the solvent removed in vacuo, leaving 4.0 g. of solid or approximately 87% yield of 1,2-(bis-bicyclo-[2.2.1]-2-nitro-5-heptene)-ethane (M.P. 130–150° C). One isomer was separated from the mixture of diastereoisomers by triturating the crude material from the reaction with hot cyclohexane. Evaporation of the cyclohexane, and the recrystallization of the residual solid several times from 95% ethanol yielded a while crystalline solid, M.P. 209.5–211° C. dec.

*Analysis.*—Calculated for $C_{16}$, $H_{20}$, $N_2O_4$; C, 63.15; H, 6.57; N, 9.21. Found: C, 62.94; H, 6.69; N, 9.41.

Despite the melting point range, the infrared spectra of the product, and the residues, obtained from the cyclohexane trituration, and evaporation of the ethanol from the filtrates, were all similar indicating that practically all of the materials obtained from the reaction were diastereoisomers of the compound analyzed.

*Example III*

To a 200 ml. flask, equipped with an efficient reflux condenser and drying tube, were added 1.64 g. (0.02 mole) of anhydrous sodium acetate, 2.92 g. (0.01 mole) of 1,6-diacetoxy-2,5-dinitrohexane, 1.32 g. (0.02 mole) of cyclopentadiene and 75 ml. of anhydrous benzene. This mixture was refluxed for 22 hours. At this time, 1.32 g. (0.02 mole) more of cyclopentadiene was added to replace the part which was converted to bicyclopentadiene. The reaction was refluxed for 19 additional hours and then filtered while hot through a sintered glass funnel. The sodium acetate in the funnel was washed with several portions of hot benzene. The washings were combined with the filtrate and the benzene was removed in vacuo, leaving a dark-brown solid. This solid was washed with 10 ml. of 95% ethanol, previously cooled to approximately −50° C. and filtered immediately. The precipitate thus obtained, weighed 2.28 g. (75% yield of product) and had a melting point of 160–170° C. dec. One of the isomers was separated by triturating the brown solid with hot heptane. Subsequent cooling of the heptane yielded a white crystalline solid, M.P. 204–205° C. dec. A mixed melting point determination with this material and an authentic sample of 1,2-bis-(bicyclo[2.2.1]-2-nitro-5-heptene)-ethane showed no depression.

*Example IV*

To a 300 ml. 3-necked flask, equipped with a condenser and drying tube, thermometer and mechanical stirrer, were added 16.1 (0.1 mole) of 3-nitro-2-butyl acetate, 0.2 g. of anhydrous sodium acetate and 130 ml. of anhydrous t-butanol. This mixture was heated at 60° C. for one hour and then 4.0 g. of cyclopentadiene was added all at once. The temperature of the reaction was maintained, and after 4 hours, 4.0 g. of additional cyclopentadiene was added. Further additions of 4.0 g. and 3.0 g. portions of cyclopentadiene were made after a reaction time of 24 and 29 hours respectively. The reaction was allowed to continue for 16 additional hours and the solvent was then removed in vacuo. The residual liquid was taken up in ether and filtered through a sintered glass to remove the sodium acetate. The ether was then removed from the filtrate in vacuo. The residual oil was distilled through a steam heated condenser. A fraction consisting of a mixture of solid and liquid was collected at 64–65° C. at 1.3 mm. (6.3 g.) or a 38% yield of bicyclo-[2.2.1]-2-nitro-2,3-dimethyl-4-heptene. The liquid portion of this product decomposed slowly at room temperature as indicated by darkening of its color. The solid was separated from the liquid by first cooling the mixture to 0–5° C., and then transferring the solid mass to a clay plate at room temperature. The low melting isomer was absorbed while the higher was left unabsorbed. This solid was taken up in hexane and filtered. Evaporation of the hexane yielded a white solid which could be sublimed readily (M.P. 76–77° C.).

*Analysis.*—Calculated for $C_9$, $H_{13}$, $NO_2$, C, 64.65; H, 7.84; N, 8.38. Found: C, 64.68; H, 7.80; N, 8.08.

Infrared spectra of both the liquid and solid portions were found to be quite similar, indicating that they were probably diastereoisomers.

*Example V*

To a 300 ml. 3-necked flask equipped with a stirrer, thermometer and a condenser with a drying tube, containing 16.4 g. (0.2 mole) of anhydrous sodium acetate, 14.2 g. (0.22 mole) of cyclopentadiene and 130 ml. of absolute ethanol, were added 35.0 g. (0.2 mole) of 2-nitropentyl acetate. The temperature of the reaction was then raised to 45–50° C. and maintained at that point for 30 hours. The solvent was then removed in vacuo and the residual material was transferred to a separatory funnel, employing a small amount of water and ether to aid in the transferring. The aqueous layer was then extracted several times with small portions of ether, the extracts were combined and the solvent removed in vacuo. The residual oil was distilled and 26.5 g. of bicyclo[2.2.1]-2-nitro-2-propyl-5-heptene was obtained (72% yield), B.P. 101–103° C. at 7.5–8.0 mm. Redistillation of this fraction yielded the analytical sample, B.P. 68° C. at 1–1.5 mm; $n_D^{22}$ 1.4823.

*Analysis.*—Calculated for $C_{10}$, $H_{15}$, $NO_2$: C, 66.30; H, 8.29; N, 7.73. Found: C, 66.54; H, 8.55; N, 8.02.

Now having described our invention, what we claim is:
1. The process for the production of bicyclo nitro compounds having the following structural formula:

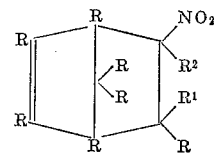

where R is selected from the group consisting of hydrogen, alkyl and aryl; $R^1$ is selected from the group consisting of hydrogen, alkyl, aryl, perhalo alkyl, $$-CH_2-O-R, \quad -CH(OR^3)_2$$

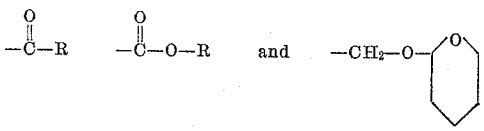

$R^2$ is selected from the group consisting of hydrogen, alkyl, aryl, halo, perhalo alkyl, $-NO_2$, nitro alkyl, $-CH_2-O-X$, $-CH(OR^3)_2$, $-CN$,

and the radical:

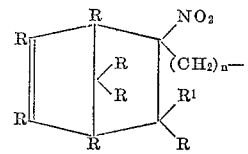

where $n$ is an integer having a value ranging from 1 to 10, where X is selected from the group consisting of alkyl having from 1 to 10 carbon atoms and tetrahydropyran, and where $R^3$ is selected from the group consisting of alkyl having from 1 to 10 carbons, which comprises reacting in the presence of a weak base, a nitroester having the following structural formula:

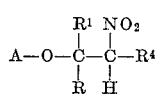

where $R^4$ is selected from the group consisting of hydrogen, alkyl, aryl, halo, perhalo alkyl, nitro, nitro alkyl, $-CH_2OX$, $-CH(OR)_2$, $-CN$,

and the following radical:

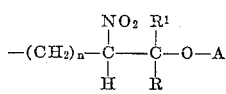

where A is selected from the group consisting of

$-SO_2R$, $-SO_3H$, $-NO_2$, and phosphoric acid radicals;

with a cyclopentadiene having the following structural formula:

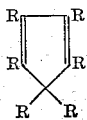

2. Process for the production of bicyclo[2.2.1]-2-nitro-3-perfluoropropyl-5-heptene which comprises reacting in the presence of anhydrous sodium acetate at a temperature not substantially in excess of 50° C. and in an inert solvent a mixture of cyclopentadiene and 2-perfluoropropyl-2-acetoxy-1-nitroethane.

3. A process for the production of 1,2-bis(bicyclo[2.2.1]-2-nitro-5-heptene)-ethane which comprises reacting in the presence of anhydrous sodium acetate at a temperature of approximately 40° C. a mixture of cyclopentadiene and 1,6-diacetoxy-2,5-dinitrohexane.

4. A process for the production of bicyclo[2.2.1]-2-nitro-2,3-dimethyl-5-heptene which comprises reacting in the presence of anhydrous sodium acetate a mixture of cyclopentadiene and 3-nitro-2-butyl acetate in an inert solvent.

5. A process for the preparation of bicyclo[2.2.1]-2-nitro-2-propyl-5-heptene which comprises reacting in the presence of anhydrous sodium acetate a mixture of 2-nitropentyl acetate and cyclopentadiene in absolute alcohol solution.

6. Bis-bicyclo nitro compounds having the following structural formula:

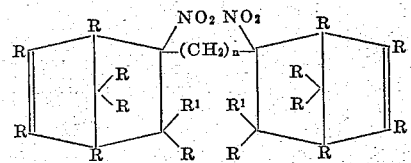

where R is selected from the group consisting of hydrogen, alkyl and aryl; $R^1$ is selected from the group consisting of hydrogen, alkyl, aryl, perhalo alkyl, $$-CH_2-O-R, \text{ and } -CH(OR^3)_2$$

$R^3$ is selected from the group consisting of alkyl having from 1 to 10 carbons; and $n$ is an integer having a value from 1 to 10.

7. 1,5 - (bis - bicyclo[2.2.1] - 2 - nitro - 3 - phenyl-3-methyl-5-heptene)-pentane.

8. 1,8 - (bis - bicyclo[2.2.1] - 2 - nitro - 3 - perfluoropropyl-5-heptene)-octane.

9. 1,7 - (bis - bicyclo[2.2.1] - 2 - nitro - 3 - acetyl - 5-heptene)-heptane.

10. 1,3 - (bis - bicyclo[2.2.1] - 2 - nitro - 3 - (2 - tetrahydropyranoxymethyl)-5-heptene)-propane.

References Cited in the file of this patent

Noland et al.: "J.A.C.S." 77, 6386–87 (1955).
Wildman et al.: "J. Org. Chem." 17, 1641–45 (1952).